W. O'NEILL.
HORSESHOE.
APPLICATION FILED APR. 18, 1913.
1,131,858.
Patented Mar. 16, 1915.
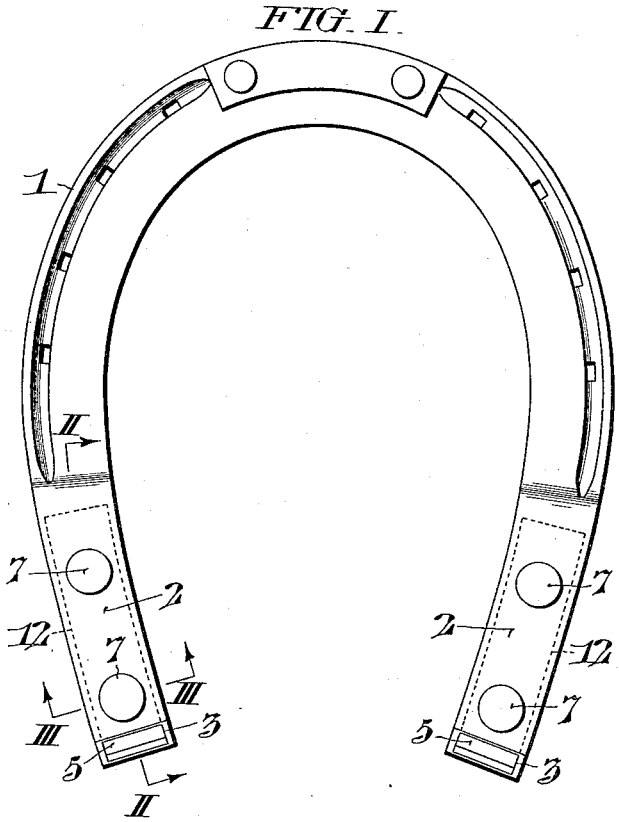
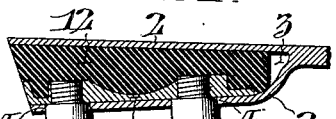
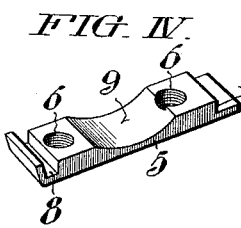
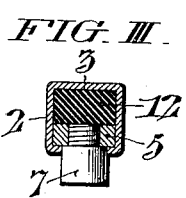
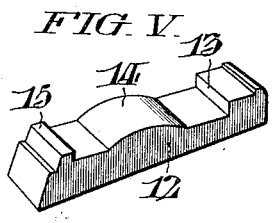
Witnesses
Inventor
Wesley O'Neill,
Attorneys

UNITED STATES PATENT OFFICE.

WESLEY O'NEILL, OF RUSSELLVILLE, PENNSYLVANIA.

HORSESHOE.

1,131,858.  Specification of Letters Patent. Patented Mar. 16, 1915.

Application filed April 18, 1913.  Serial No. 761,873.

*To all whom it may concern:*

Be it known that I, WESLEY O'NEILL, residing at Russellville, in the county of Chester and State of Pennsylvania, have invented certain new and useful Improvements in Horseshoes, whereof the following is a specification, reference being had to the accompanying drawings.

My invention relates to the provision of detachable cushioned calks for horse shoes, and particularly to the employment of double calks on each heel piece of the horse shoe, to the cushioning means for the calks, and to the means for securing the calks and cushion within the shoe.

In the accompanying drawings, Figure I, represents a horse shoe embodying my invention. Fig. II, is a section along the line II, II, of Fig. I. Fig. III, is a section along the line III, III, of Fig. I. Fig. IV, is a perspective view of the calk plate to which a pair of calks are attached. Fig. V, is a perspective view of the cushion.

It will be understood that my invention is specially applicable to light shoes such as are required on a race track, and that one of its objects is the provision of suitable cushioned calks with their securing means without increasing the weight of the shoe.

Individual heel calks have heretofore been used, one being attached to each heel of the shoe. A horse when turning rapidly is apt to strike the ground with only one corner of his shoe, so that if this heel is provided with but one calk, the horse's leg may swing around upon this calk and turn the foot. To prevent this, I provide double calks for each heel piece, thus giving the horse a firm footing even though but the corner of the shoe touches the ground.

Each heel of the shoe 1, is made with an enlarged portion 2, hollowed out to provide a socket 3. The lower side of the socket is pierced with two apertures 4, one for each calk. Thus the entire shoe is integral and without set screws for the calks. A single calk plate 5, rests within and on the lower side of the socket 3, and is provided with screw threaded holes 6, 6, into each of which one of the calks 7, is screwed, after the calk plate is in its place within the receptacle. The calks project through the apertures 4, 4. The upper surface of the calk plate is uneven in its shape by reason of the provision of the groove 8, the larger groove 9, and the shoulder 10.

The rubber cushion 12, is made of a shape to accurately fit within the socket 3, its lower surface being given a configuration which allows it to closely conform itself to the irregularities of the calk plate, which have been referred to, including a shoulder 13, which fits against the shoulder 10, a projection 14, which fits into the large groove 9, and a rib 15, which fits into the smaller groove 8. When the rubber cushion is inserted in place through the open end of the socket in the heel of the shoe, it is firmly held in place by the interlocking of its surface with the corresponding surface of the calk plate. It will be noted that the rubber cushion holds the calk plate in proper position, within the shoe, and that the calk plate in turn holds the calks. There is therefore no necessity of providing any set screw or detachable holding piece for fastening the calks in place.

The two calks are jointly cushioned by the rubber cushion, and work in unison upon it. The hollow or socketed heel forms a solid piece without riveted or screwed parts, the socket open at the end gives room for the rubber to expand and makes it easy to replace.

Having thus described my invention, I claim:

1. A horse shoe having its heel pieces hollowed to form sockets open at the end of the heel piece; a calk plate within the socket; one or more calks secured to said calk plate and projecting below the shoe through apertures appropriately formed in the under side of the socket; and a cushioning block inserted within the socket through the open end therein, holding the calk plate in place and cushioning it.

2. A horse shoe having a hollow heel piece with a socket therein, opening at the end of the shoe; a calk plate within the socket, provided with two or more calks, projecting through apertures in the heel, and having an upper surface of irregular configuration; and a rubber cushioning piece with an opposed surface of similar irregular configuration capable of being inserted into the socket so as to hold the calk plate in place and cushion the calks.

3. A horse shoe having a hollow heel piece with a socket therein; a calk plate within the socket; two or more calks attached to the calk plate, and projecting through apertures in the heel; and a cushioning piece inserted in the socket between the calk plate and the upper wall of the socket.

In testimony whereof, I have hereunto signed my name at Russellville, Penna., this twelfth day of April, 1913.

WESLEY O'NEILL.

Witnesses:
FRANK IRVIN JOHNSON,
WILLIAM JAMES MAGILL.

Copies of this patent may be obtained for five cents each, by addressing the "Commissioner of Patents, Washington, D. C."